United States Patent
Schwab

(10) Patent No.: US 6,309,576 B1
(45) Date of Patent: Oct. 30, 2001

(54) METHOD FOR SETUP AND MOLDING OF FORMED ARTICLES FROM THIN COATED FABRICS

(75) Inventor: Charles Gibson Schwab, Nashua, NH (US)

(73) Assignee: Diacom Corporation, Amherst, NH (US)

(*) Notice: Subject to any disclaimer, the term of this patent is extended or adjusted under 35 U.S.C. 154(b) by 0 days.

(21) Appl. No.: 09/479,144

(22) Filed: Jan. 7, 2000

Related U.S. Application Data

(63) Continuation of application No. 09/249,508, filed on Feb. 12, 1999, now abandoned.
(60) Provisional application No. 60/074,472, filed on Feb. 12, 1998.

(51) Int. Cl.⁷ .................................................. B29C 43/04
(52) U.S. Cl. ........................ 264/161; 264/219; 264/257; 264/258; 264/320
(58) Field of Search .................... 264/219, 161, 264/257, 259, 320, 258

(56) References Cited

U.S. PATENT DOCUMENTS

| | | | |
|---|---|---|---|
| 3,270,110 | * 8/1966 | Downie et al. | 264/219 |
| 3,428,727 | * 2/1969 | Higgins | 264/219 |
| 3,591,903 | * 7/1971 | Bowles | 425/78 |
| 3,604,060 | * 9/1971 | Lundstrom | 425/405.1 |
| 3,627,861 | * 12/1971 | Timke | 264/680 |
| 3,678,987 | * 7/1972 | Kydd | 164/45 |
| 4,014,970 | * 3/1977 | Jahnle | 264/161 |
| 4,115,488 | * 9/1978 | Colpitts | 264/17 |
| 4,238,179 | * 12/1980 | Llabres et al. | 425/394 |
| 4,243,367 | * 1/1981 | Renoux | 425/385 |
| 4,436,478 | * 3/1984 | Allen et al. | 414/752 |
| 4,486,375 | * 12/1984 | Hirai | 264/254 |
| 4,496,299 | * 1/1985 | Pettersson | 425/405 H |
| 4,508,309 | * 4/1985 | Brown | 249/81 |
| 4,558,499 | * 12/1985 | Brown | 29/157.3 R |
| 4,597,730 | * 7/1986 | Rozmus | 425/78 |
| 4,618,322 | * 10/1986 | Lagasse | 425/129 R |
| 4,788,023 | * 11/1988 | Buhler et al. | 264/517 |
| 4,812,115 | * 3/1989 | Kemp | 425/405.2 |
| 4,822,273 | * 4/1989 | Adams et al. | 425/385 |
| 4,869,603 | * 9/1989 | Melzer et al. | 384/255 |
| 5,035,766 | * 7/1991 | More et al. | 156/581 |
| 5,057,273 | * 10/1991 | Hanson | 419/68 |
| 5,059,105 | * 10/1991 | Baird | 425/116 |
| 5,066,344 | * 11/1991 | Inami et al. | 264/279.1 |
| 5,118,271 | * 6/1992 | Baird et al. | 425/116 |
| 5,191,923 | * 3/1993 | Goss | 164/292 |
| 5,213,000 | * 5/1993 | Saya et al. | 74/425 |
| 5,332,190 | * 7/1994 | Watanabe et al. | 249/115 |
| 5,344,296 | * 9/1994 | Laninga | 425/121 |
| 5,543,159 | * 8/1996 | Iltgen | 425/543 |
| 5,788,903 | * 8/1998 | Allgaier | 264/219 |
| 5,795,596 | * 8/1998 | Stanton et al. | 425/116 |
| 5,935,500 | * 8/1999 | Stanton et al. | 264/219 |
| 6,072,009 | * 6/2000 | Phillips, Jr. et al. | 525/346 |

FOREIGN PATENT DOCUMENTS

831158 * 3/1960 (GB).
2141372 * 12/1984 (GB).

* cited by examiner

Primary Examiner—Allan R. Kuhns
(74) Attorney, Agent, or Firm—Vernon C. Moine; Scott J. Asmus

(57) ABSTRACT

A method for setting up and molding or forming thin coated fabrics as in the production of diaphragms, where a hard die is installed on one plate of a pair of molding plates and a comparably sized or somewhat large die cavity is provided on the opposing plate, the plate set being then assembled in a molding press in conventional fashion. The die cavity is filled with an uncured elastomer and the press closed under enough heat and pressure to mold in place an exact elastomer mating die, unique to that plate and press setup. Once the elastomer is cured or vulcanized, the mold is opened and the excess flash is trimmed off. From this point on, the mold is used in the same manner as a traditional mold for molding formed articles such as diaphragms from thin coated fabrics, until the setup is disassembled or otherwise disturbed, after which the elastomer mating die is no longer useful.

12 Claims, 1 Drawing Sheet

METHOD FOR SETUP AND MOLDING OF FORMED ARTICLES FROM THIN COATED FABRICS

This application is a continuation of U.S. application Ser. No. 09/249,508, filed Feb. 12, 1999, now abandoned, which application claims the benefit of U.S. Provisional Application No. 60/074,472 filed Feb. 12, 1998.

BACKGROUND OF THE INVENTION

1. Field of Invention

This invention relates to methods for obtaining closely matched die sets in molding and forming press setups for the production molding of diaphragms and like structures with thin coated fabrics; more particularly to methods for creating a closely matched die set in a given setup on a mold machine for molding diaphragms from rubber coated fabric.

2. Background Art

Thin, coated fabrics are used for molding or forming a variety of specialty products including very small flexible diaphragms which must exhibit very consistent operating characteristics. The problem in using a traditional mold for producing these products is in the machining and set up of the male and female halves of the mold to a close enough tolerance. When they are brought together with a very thin layer of material between them, there are likely to be voids for which a significant amount of flow of the coating is required to fill. Excessive voids require excessive temperature and pressure to achieve the necessary flow, and this increases the likelyhood of inconsistant performance of the product from one setup to the next, and from one cycle to the next.

The following prior art provides useful context for better understanding the invention:

U.S. Pat. 4,889,668 discloses a fixed-volume, trapped rubber molding method encompassing a complex temperature and sensor apparatus used in conjunction with casting elastomeric material cured around the die to form a die support structure.

U.S. Pat. 5,700,496 discusses a self adjusting backplate for supporting one or both sides of the mold plates of a blow-molding machine with a cushioning material on the outer plate surface. The specially designed cushioning material allegedly absorbs the pressure and allows the molding to proceed without shims, providing equal pressure along the mold plates.

U.S. Pat. 5,093,067 shows a method for injection molding of fabric reinforced elastomer diaphragms, where a fabric is placed between a mold plates. Elastomeric material is injected into the mold through ports and allowed to cure, producing thin diaphragms without migration or distortion of the fabric.

Skilled practitioners will appreciate the short comings of the prior art as contrasted to the benefits of the instant invention, including the desirability for achieving a closing confirming die pair setup, and reducing the problem of voids and the need for flowing of coating material when using coated fabrics for forming or molding formed articles such as diaphragms.

SUMMARY OF THE INVENTION

It is a goal of the invention to provide a method for setting up a molding press with a matching die set for molding formed articles from coated fabric materials, such that opposing die surfaces are closely conforming and closely aligned when the press is closed, voids between the dies and the sheet material are minimal, and dependence on flow of the coating of the coated fabrics is minimal.

It is a further goal of the invention to provide a custom setup and forming or molding methodology for fabricating formed articles from thin coated fabric materials that permits the use of thinner coated fabric materials and larger diameter diaphragms, is less susceptible to irregularities due to voids and requires less flow within the mold during the molding process, resulting in more uniformity and fewer rejects across the production run.

There is provided within the scope of the invention a method for setting up a molding press, whereby a first component forming die, typically made of a bard material that will stand up to the rigors of many, many molding cycles, is immovably installed on a first plate of a pair of molding plates. An opposing die cavity is milled, drilled or otherwise provided on the second plate, opposite the forming die. The plate set is installed in the press in the usual fashion.

The die cavity then filled with an uncured elastomer such that when cured will be resistant to high temperature, and to such elements and compounds as may be encountered in production process. The press is then closed, bringing the elastomer into contact across the full forming surface of the first die. Suitable heat and pressure are applied, causing the elastomer to be cured into an immovable, perfectly aligned, molded in place, mating die counterpart to the hard die, unique to that specific setup.

Once the elastomer is cured or vulcanized, the mold is opened and the excess flash is trimmed off, and the press is ready for production. From this point on, the mold is used in the conventional manner for molding thin coated fabrics. The benefit of the invention is lost, of course, when the setup is disturbed or disassembled.

Other objects and advantages of the invention will be apparent to those skilled in the art, from the drawings, description and claims that follow.

DESCRIPTION OF THE PREFERRED EMBODIMENT

The invention is susceptible of many variations. The below description is of a preferred embodiment for setting up a forming or molding press with a matched set of dies for molding formed articles such as thin coated fabric diaphragms made from thin sheet materials, including thin rubber coated fabric diaphragms, but is in no way limiting of the scope of the invention.

A mold is constructed by the method of the invention. The first half component consists of a traditional steel female die with forming cavities, installed on a first mold plate with a locking collar. The opposing second half component of the mold uses the second matching mold plate configured by conventional means for accurate, repetitive alignment with the first mold plate when used in a molding press. The opposing area on the second plate is drilled out to accommodate the creation of the male die. The mold is then closed in proper plate to plate alignment and installed in a molding press.

The milled out pocket in the second plate is then filled with an uncured elastomer and the press closed under enough heat and pressure to mold a precisely positioned, exact male counterpart die for that specific combination of female component and mold set; a molded in place, elastomer male die. Once the elastomer is vulcanized, the mold is opened and the excess flash is trimmed off. The cured die is able to withstand temperatures up to 500 degrees Fahrenheit, and is resistant to the various materials typically present in the process of molding diaphragms.

From this point forward, the press is used in production in the same manner as a traditional set of dies and molding plates. The heat and pressure on the rubber coated fabric causes it to form and flow to fill what small voids may remain, but the close tolerance fit of the molded-in-place, elastomer die to the hard die minimizes voids and the dependence on flow during the compression phase.

Figure 1:
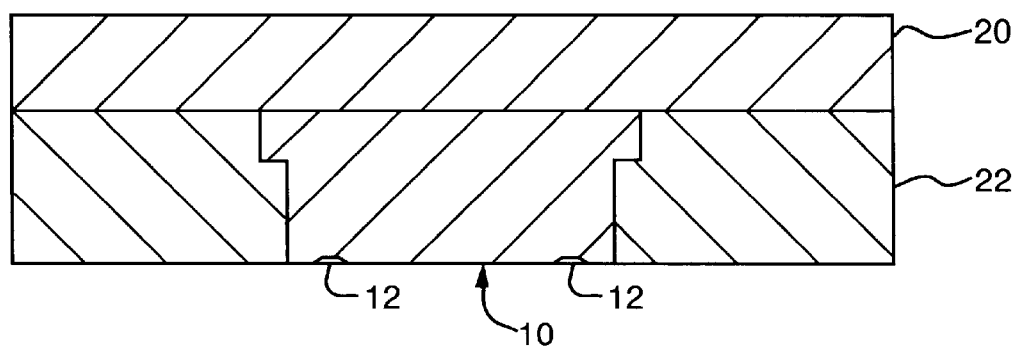
FIG. 1 is a cross section view of a first plate of a pair of mold plates, with a machined steel female die suitable for molding a thin, coated fabric diaphragm, immovably installed on the plate.
Figure 2:
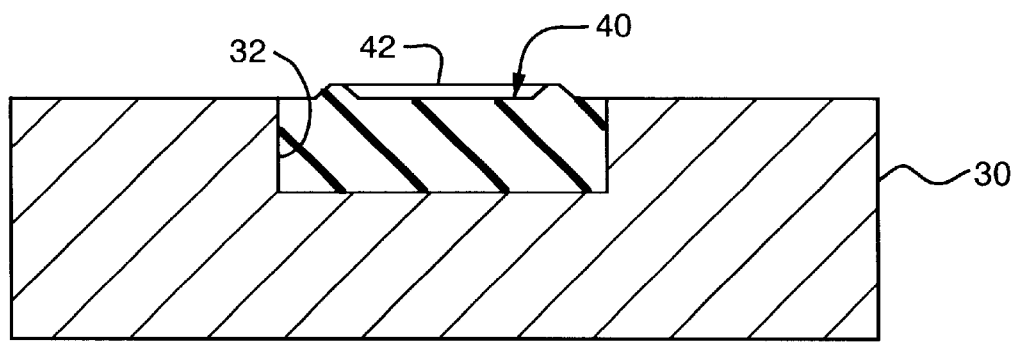
FIG. 2 is a cross section view of the second plate of the pair of plates of FIG. 1, with an elastomer male die which was molded in the closed plate set to match the die of FIG. 1.

Referring to FIGS. 1 and 2, a mold consists of a first mold plate 20 and die locking collar 22, and an opposing mold plate 30. A traditional steel female diaphragm die 10 with circular forming ring cavity 12, is immovably installed on first mold plate 20, by collar 22. Opposing mold plate 30 is configured by conventional means for accurate, repetitive alignment with first mold plate 20 when the set is installed in a molding press. The matching area on opposing mold plate 30 is configured with die cavity 32.

Plates 20 and 30 are then closed in proper plate to plate alignment and installed in a molding press in the conventional manner. Die cavity 32 in plate 30 is then filled with a suitable uncured elastomer and the press closed under enough heat and pressure to mold an exact male counterpart form for that specific combination of female component and mold set; a molded-in-place elastomer male die 40 with matching circular forming ring profile 42. Once the elastomer is vulcanized, the mold is opened and the excess flash is trimmed off. Suitable elastomers are available to produce a cured elastomeric die 40 able to withstand temperatures upwards of 500 degrees Fahrenheit and resistant to the process materials typically present in the user's molding process. From this point on, the mold is used in the same manner as a traditional mold.

The invention is susceptible of many variations and applicable in many ways for forming or molding, the terms being interchangable in the context of the invention and the claims thereto. For example, there may be a method for setting up for molding formed articles from thin sheet material on a molding press that is configurable with two opposing plates for holding respective matching dies, and having pins or other conventional or novel means for maintaining consistent alignment between the plates when they are brought together for molding.

The method may include the steps of immovably positioning a hard die on a first plate, configuring the second plate with a die cavity opposite the hard die, and installing the set of plates on the molding press. The die cavity would then be filled with uncured elastomeric material, the molding press closed under sufficient heat and pressure to cure the elastomeric material so as to create a molded in place elastomer mating die in the die cavity. The method may include opening the molding press and trimming excess flash from the edges of the mating die.

As a further example, this or other set up methods of the invention may be extended to be a method for the molding of formed articles such as diaphragms, by emplacing at least one layer of a thin sheet material between the hard die and the mating die, and closing and forming the desired article, such as a thin coated fabric diaphragm, under pressure between the hard die and the mating die, and then opening the molding press and removing the article. Repetitive operation of these steps would constitute production use of the setup.

As a yet further example, there may be multiple hard dies on the first plate, with multiple opposing die cavities on the second plate, one opposite each hard die, for molding several articles in each single operation of the press, as is common in the industry.

As other examples, the method may employ thin sheet material in the range of 0.0002 to 0.025 inches thick, and be mullet-layered as well. The thin sheet material may be a rubber coated fabric material.

Other embodiments and variations will be apparent from the description, drawings and following claims, all within the scope of the invention.

What is claimed is:

1. A method for setting up for molding formed articles from thin sheet material on a molding press configurable with two opposing plates for holding respective matching dies and having means for maintaining consistent alignment between said plates when brought together for molding, comprising the following steps of:

immovably positioning a hard die for a first side of said formed articles on a first of said plates, configuring a second of said plates with a die cavity opposite said hard die, installing said plates on said molding press, filling said die cavity with uncured elastomeric material, closing said hard die against said elastomeric material under sufficient heat and pressure to cure said elastomeric material so as to create a molded in place elastomer mating die in said die cavity, and maintaining said hard die and said elastomer mating die undisturbed in said plates and said plates undisturbed in said press during said molding of said formed articles.

2. The method of claim 1, said thin sheet material being rubber coated fabric material.

3. The method of claim 1, said formed articles being diaphragms, said thin sheet material being in the range of 0.0002 to 0.025 inches thick.

4. The method of claim 3, said thin sheet material being multi-layered.

5. A method for molding thin coated fabric diaphragms from thin sheet material on a molding press configurable with two opposing plates for holding respective matching dies and having means for maintaining consistent alignment between said plates when brought together for molding, comprising the following steps:

immovably positioning a hard die on a first said plate, configuring a second said plate with a die cavity opposite said hard die, installing said plates on said molding press, filling said die cavity with uncured elastomeric material, closing said molding press under sufficient heat and pressure to cure said elastomeric material so as to create a molded in place elastomer mating die in said die cavity, opening said molding press and trimming excess flash from said mating die, emplacing at least one layer of said thin sheet material between said hard die and said mating die, closing and forming a said thin coated fabric diaphragm under pressure between said hard die and said mating die, and opening said molding press and removing said diaphragm therefrom.

6. The method of claim 5, said thin sheet material being rubber coated fabric material.

7. The method of claim 6, said thin sheet material being in the range of 0.0002 to 0.025 inches thick.

8. The method of claim 7, said thin sheet material being multi-layered.

9. A method for setting up a matched die set for molding formed articles from thin sheet material on a molding press having two opposing plates and means for maintaining consistent alignment between said plates when brought together for molding, comprising the following steps:

immovably positioning a hard die for a first side of said formed articles on a first of said plates, configuring an opposing die cavity on a second of said plates opposite said hard die, filling said die cavity with uncured elastomeric material, closing said hard die against said elastomeric material under sufficient heat and pressure to cure said elastomeric material so as to create a molded in place elastomer mating die in said die cavity, and maintaining said hard die and said elastomer mating die undisturbed in said plates and said plates undisturbed in said press during said molding of said formed articles.

10. The method of claim 9, said thin sheet material being rubber coated fabric material.

11. The method of claim 9, said thin sheet material being in the range of 0.0002 to 0.025 inches thick.

12. The method of claim 11, said thin sheet material being multi-layered.

* * * * *